3,164,623
O-CYANOPHENYL ESTERS OF ALKYL-
PHOSPHONIC, ALKYLTHIOPHOSPHON-
IC, DIALKYLPHOSPHINIC, AND DIAL-
KYLTHIOPHOSPHINIC ACIDS
Gerhard Schrader, Wuppertal-Cronenberg, Germany, assignor to Farbenfabriken Bayer Aktiengesellschaft, Leverkusen, Germany, a corporation of Germany
No Drawing. Filed Mar. 19, 1962, Ser. No. 180,822
Claims priority, application Germany Mar. 28, 1961
5 Claims. (Cl. 260—461)

The present invention relates to and has as its objects new and useful insecticidal active phosphorus containing compounds and the production thereof. The new inventive compounds may be represented by the following general formula

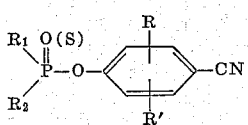

wherein $R_1$ and $R_2$ stand for identical or different, preferably lower alkyl or alkoxy radicals, whilst R and R' represent lower alkyl groups.

In the specification of the Belgian Patent No. 610,433 there has already been described a process for the production of thio-phosphoric(-onic, -inic) acid esters, characterised in that O,O-dialkyl-thionophosphoric acid halides or alkylthiono-phosphinic acid-O-alkyl ester halides or dialkylthiono-phosphinic acid halides, respectively, are reacted with halogeno-4-cyano- or lower alkyl-4-cyano-phenates or with the corresponding free phenols in the presence of acid binding agents.

It has now been found that (thio)-phosphoric (onic, -inic) acid esters of 4-cyano-phenols of the aforesaid type containing in the phenyl nucleus two lower alkyl radicals as further substituents in addition to the cyano group, are distinguished by excellent insecticidal properties without being especially toxic and therefore are extremely suitable as pest control agents or as plant protection agents.

The production of the (thio)-phosphoric(-onic, -inic) acid esters according to the invention is carried out by methods known in principle, i.e. by the reaction of O,O-dialkyl-(thiono)-phosphoric acid halides or alkyl-(thiono)-phosphonic acid-O-alkyl ester halides or dialkyl-(thiono)-phosphinic acid halides, with di-lower alkyl-4-cyano-phenolates or with the corresponding free phenols in the presence of acid binding agents, e.g. alkali metal alcoholates or alkali metal carbonates.

In carrying out the reaction it is advantageous to use inert organic solvents. Hydrocarbons such as benzene, also lower boiling aliphatic alcohols (methanol or ethanol) as well as lower aliphatic nitriles, e.g. acetonitrile, have proved particularly suitable in this respect.

Furthermore, the reaction is conveniently carried out at a slightly to moderately elevated temperature, and the mixture is further heated for some time (1 to 5 hours) after combination of the starting materials, in order to complete the reaction.

Some of the inventive compounds are solid products which usually solidify already as crystals after distilling off the solvent from the reaction mixture and which can readily be further purified by recrystallisation; however, some of the products are also obtained in the form of colourless oils capable of being distilled in a high vacuum.

It has already been mentioned above, that the novel (thio)-phosphoric(-onic, -inic) acid esters of the di-lower alkyl-4-cyano-phenols possess an excellent insecticidal activity towards a series of harmful insects, and are therefore intended to be applied as pest control agents, particularly in plant protection. The new compounds of the present invention very effectively kill caterpillars, mosquito larvae and aphids.

The application of the products according to the invention for the said purpose is carried out in the same manner as usual for pest control or plant protection agents based on insecticidal phosphoric acid esters, i.e. in a concentration from about 0.00001% to about 1% preferably in combination with suitable solid or liquid extenders, carriers or diluents.

The production of such formulations is expediently carried out by simultaneously employing commercial auxiliary agents for compounding, such as, e.g., talc, chalk, silica gel, bentonites, vermiculites, carbon black, and the like, where as water has proved to be most suitable as a liquid diluent. However, since the inventive (thio)-phosphoric(-onic, -inic) acid esters are largely water insoluble, the application of a solubiliser and also of an emulsifier is necessary or advantageous for the preparation of aqueous formulations.

The new compounds may furthermore be used in combination with each other or with known insecticides, fertilizer etc.

As an example for the special utility of the inventive compounds the compounds of the following formulae (I)

(II)

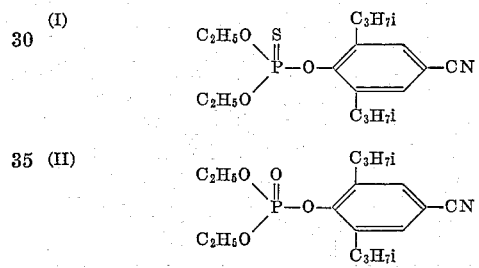

have been tested against caterpillars (in case of Compounds I and II), mosquito larvae of the type Aedes aegyptii (in case of the Compound I) and aphids (in case of the Compound II).

Aqueous solutions of the aforementioned compounds have been prepared by admixing them with the same amount of dimethyl formamide as an auxiliary solvent adding thereto 20% by weight referred to active ingredient of a commercial emulsifier consisting of a benzyl hydroxy polyglycol ether containing about 10 to 15 glycol residues, and diluting this premixture at last with water to the desired concentration indicated in the following paragraphs. The tests have been carried out as follows:

(a) Against caterpillars: white cabbage has been sprayed drip wet with aqueous emulsions as prepared above in the concentration as indicated below. Caterpillars (of the type diamond black moth, 10 each) have been placed on the sprayed leaves of the white cabbage. The living status has been determined after 24 hours and 48 hours. The result are to be seen from the following table:

| Compound | Aqueous concentration (in percent active ingredient/water) | Killing rate (in percent) |
|---|---|---|
| (I) | 0.01 | 50 |
| (II) | 0.1 | 100 |

(b) Against mosquito larvae of the type Aedes aegyptii. About 20 larvae were brought into diluted aqueous emulsions prepared as described above. Counting of the dead pests occurred after 24 hours. The following results have been obtained:

| Compound | Aqueous concentration (in percent active ingredient/water) | Killing rate (in percent) |
|---|---|---|
| (I) | 0.001 | 100 |

(c) Against aphids (*Doralis fabae*). Heavily infested bean plants (*Vicia faba*) have been sprayed drip wet with solutions as prepared above. The effect has been determined after 24 hours by counting the dead pests either on the surface of the soil or still remaining on the plants. The following results have been obtained:

| Compound | Aqueous concentration (in percent active ingredient/water) | Killing rate (in percent) |
|---|---|---|
| (II) | 0.1 | 100 |

The following examples permit a survey over the invention as claimed:

Example 1

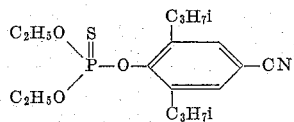

A solution of sodium ethylate containing 0.25 mole of dissolved sodium is added with stirring to a solution of 51 g. (0.25 mole) of 2,6-diisopropyl-4-cyano-phenol in 100 cc. of ethanol, and subsequently 47 g. (0.25 mole) of O,O-diethyl-thionophosphoric acid chloride are added dropwise with further stirring to the mixture at 40° C. which is then heated to 60° C. for another 4 hours, and then poured into 300 cc. of ice water. The separated oil is taken up in 250 cc. of benzene, the benzene solution is washed with water until it has a neutral reaction and finally dried over sodium sulphate. After distilling off the solvent the fractional distillation of the residue produces the O,O-diethyl-thionophosphoric acid-O-(2,6-diisopropyl-4-cyanophenyl) ester of B.P. 136° C./0.01 mm. Hg. The product solidifies as crystals within a short time, and then exhibits a melting point of 86° C. Yield: 70 g. corresponding to 79% of the theoretical amount.

The mean toxicity ($LD_{50}$) of the compound amounts to 750 mg. per kg. of animal (rats, administered orally). Caterpillars are killed to 50% by 0.01% solutions and mosquito larvae are completely destroyed by 0.001% solutions of the ester. By exactly the same way there may be obtained the following compounds:

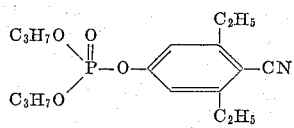

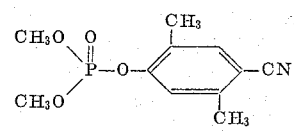

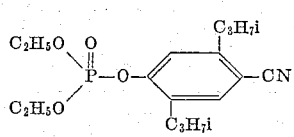

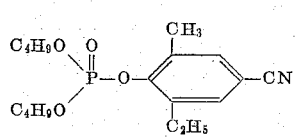

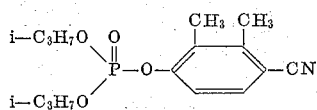

Example 2

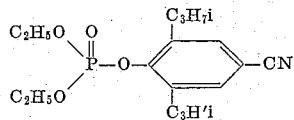

51 g. (0.25 mole) of 2,6-diisopropyl-4-cyano-phenol are dissolved in 100 cc. of methanol, and a solution of sodium methylate, which contains 0.25 mole of dissolved sodium, is added to this solution. The employed methanol is thus removed by azeotropic distillation after the addition of 500 cc. of benzene. The residual sodium 2,6-diisopropyl-4-cyano-phenate is taken up in 300 cc. of acetonitrile, 44 g. (0.25 mole) of O,O-diethyl-phosphoric acid chloride are then added dropwise with stirring at 80° C. to the reaction mixture which is heated to 80° C. for 2 hours, and then poured into 200 cc. of ice water. The separated oil is taken up in 200 cc. of benzene, the benzene solution washed with water and dried over sodium sulphate. After distilling off the solvent the fractional distillation of the residue produces 60 g. (71% of the theoretical yield) of O,O-diethyl-phosphoric acid-O-(2,6-diisopropyl-4-cyanophenyl) ester with B.P. 132° C/0.01 mm. Hg.

The compound possesses a mean toxicity ($LD_{50}$) of 100 mg. per kg. of animal (rats, oral administration). Caterpillars and aphids are killed to 100% by 0.1% solutions of the ester.

In the same manner there may be produced the following compounds:

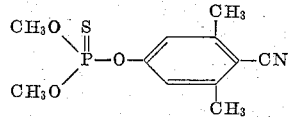

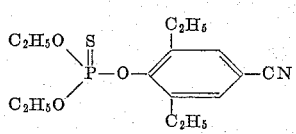

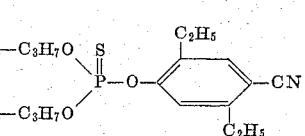

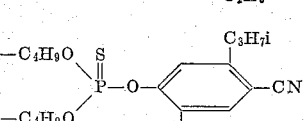

Example 3

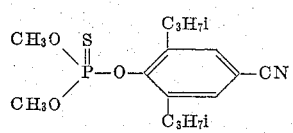

51 g. (0.25 mole) of 2,6-diisopropyl-4-cyano-phenol are dissolved in 100 cc. of methanol. A solution of sodium methylate, which contains 0.25 mole of dissolved sodium, is added to the resultant solution, followed by 500 cc. of benzene, and methanol and benzene are then azeotropically distilled off. The residual sodium salt of 2,6-diisopropyl-4-cyano-phenol is dissolved in 300 cc. of acetonitrile. This solution is treated at 80° C. with 41 g.

(0.25 mole) of O,O-dimethyl-thionophosphoric acid chloride, the reaction mixture is subsequently heated to 80° C. for another hour, and then worked up as described in the previous examples. Yield: 48 g. (59% of the theoretical amount) of O,O-dimethyl-thionophosphoric acid-O-(4-cyano-2,6-diisopropyl-phenyl) ester. M.P. 89° C.

1000 mg. of the compound per kg. of animal may be administered orally to rats without any symptoms of poisoning. Caterpillars are killed completely by 0.1% solutions of the ester, whilst termites are destroyed to 50% by 0.05% solutions. By exactly the same method there may be prepared the following compounds:

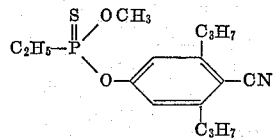

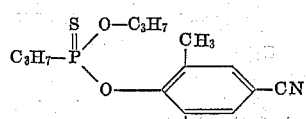

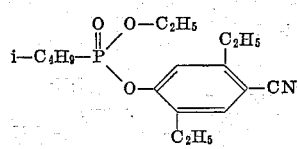

*Example 4*

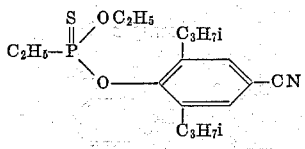

A solution of 51 g. (0.25 mole) of 2,6-diisopropyl-4-cyano-phenol in 100 cc. of anhydrous ethyl alcohol is treated with a solution of sodium ethylate, which contains 0.25 mole of dissolved sodium, and 44 g. (0.25 mole) of ethyl-thiono-phosphonic acid-O-ethyl ester chloride are then added dropwise with stirring at 50° C. to the reaction mixture, which is then heated to 70° C. for another 2 hours and subsequently poured into 200 cc. of ice water. The separated oil is taken up in 200 cc. of benzene, the benzene solution is washed with water and dried over sodium sulphate. After distilling off the solvent the ethyl-thionophosphonic acid-O-ethyl-O-(2,6-diisopropyl-4-cyano-phenyl) ester remains in the form of crystals. When recrystallised from ligroin, the product melts at 90° C. Yield: 52 g. corresponding to 61% of the theoretical amount. Rats show only symptoms after oral administration of 1000 mg. of the compound per kg. of animals, but none of the test animals died. Caterpillars are completely killed by 0.01% solutions of the ester.

In the same way there may be obtained the following compounds:

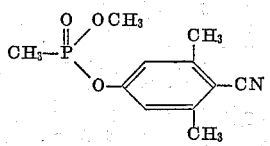

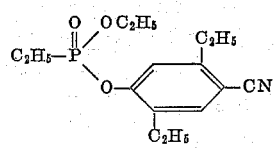

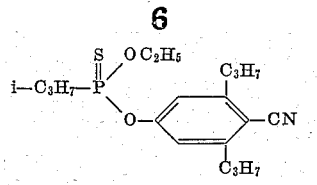

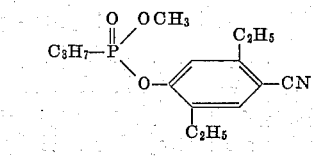

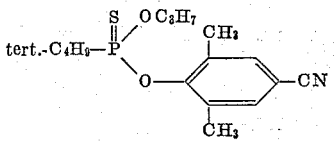

*Example 5*

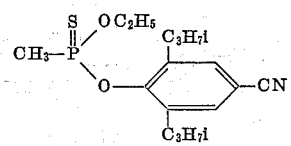

51 g. (0.25 mole) of 2,6-diisopropyl-4-cyano-phenol are dissolved in 100 cc. of ethyl alcohol. A solution of sodium ethylate, which contains 0.25 mole of dissolved sodium, is added to the resultant solution and subsequently 40 g. (0.25 mole) of methyl-thionophosphonic acid-O-ethyl ester chloride are added dropwise at 70° C. to the reaction mixture, which is warmed to 70° C. for another 2 hours, and then worked up as in the preceding example. There are obtained 52 g. (64% of the theoretical yield) of methyl-thiono-phosphonic acid-O-ethyl-O-(2,6-diisopropyl-4-cyano-phenyl) ester with M.P. 88° C.

Rats show after administration of 1000 mg. of the compound per kg. of animal symptoms of poisoning but the test animals are not killed. On the other hand caterpillars are destroyed to 100% by 0.1% solutions of the ester and termites are killed to 50% by 0.05% solutions. In the same manner there may be produced the following compounds:

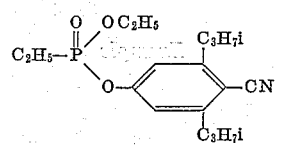

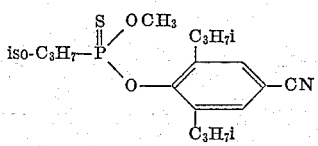

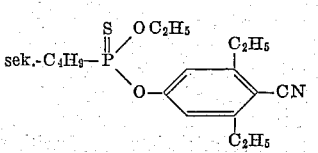

*Example 6*

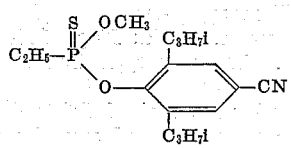

A solution of sodium methylate which contains 0.25 mole of dissolved sodium is added to a solution of 51 g.

(0.25 mole) of 2,6-diisopropyl-4-cyano-pehnol in 100 cc. of methanol; 40 g. (0.25 mole) of ethyl-thionophosphonic acid-O-methyl ester chloride are subsequently added dropwise with stirring at 60° C. to the mixture, which is heated to 70° C. for another 2 hours, and then worked up as described in the preceding examples. Yield: 43 g. (53% of the theoretical amount) of ethyl-thionophosphonic acid-O-methyl-O-(2,6-diisopropyl-4-cyano - phenyl) ester, M.P. 86° C.

The mean toxicity (LD$_{50}$) of the compound on rats per os amounts to 500 mg. per kg. of animal. Caterpillars are completely destroyed by 0.1% solutions of the ester and termites are destroyed to 50% by 0.05% solutions.

By exactly the same method there may be obtained the following compounds:

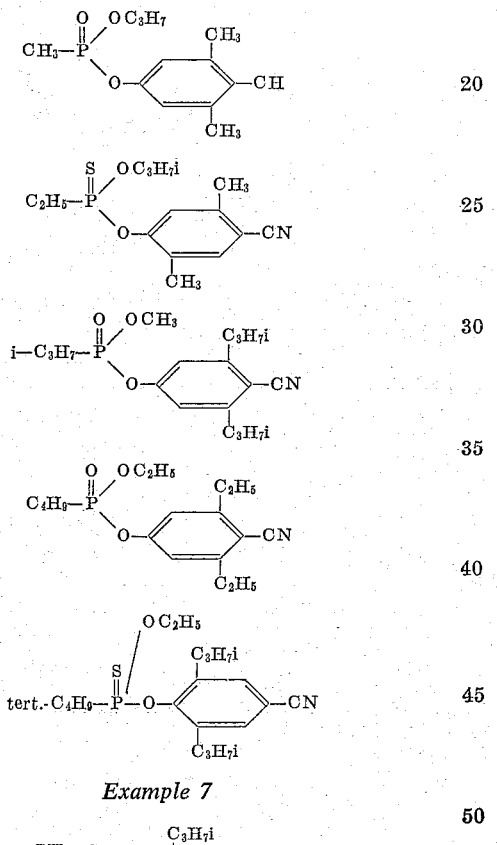

*Example 7*

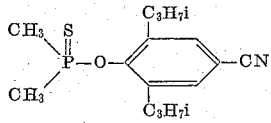

51 g. (0.25 mole) of 2,6-diisopropyl-4-cyanophenol are dissolved in 100 cc. of methanol, the solution is treated with stirring with a solution of sodium methylate which contains 0.25 mole of dissolved sodium, and subsequently 33 g. (0.25 mole) of dimethyl-thionophosphinic acid chloride are added dropwise with further stirring at 60° C. to the reaction mixture, which is stirred at 60° C. to 70° C. for another 2 hours, and then poured into 200 cc. of ice water. The separated oil is taken up in 200 cc. of benzene, the benzene solution is washed with water until the reaction is neutral, and dried with sodium sulphate. After distilling off the solvent the dimethyl-thionophosphinic acid O-(2,6-diisopropyl-4-cyano-phenyl) ester remains in the form of crystals. Yield: 50 g. (68% of the theoretical amount). When recrystallised from ligroin, the product melts at 147° C.

Rats show after the oral administration of 1000 mg. of the compound per kg. of animal no symptoms of poisoning. Caterpillars are completely destroyed by 0.1% solutions of the ester.

In the same way there may be prepared the following compounds:

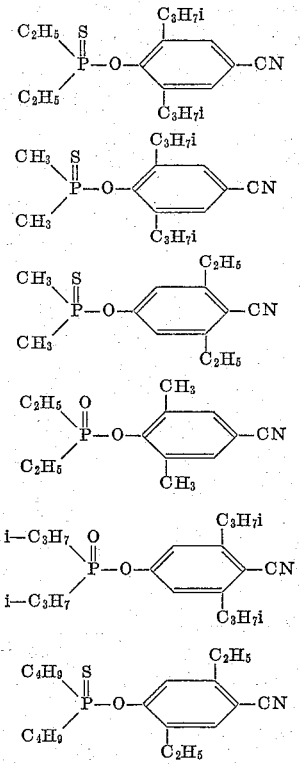

*Example 8*

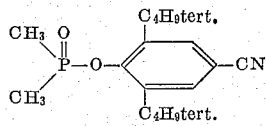

56 g. (0.25 mole) of 2,6-di-tert.butyl-4-cyanophenol are dissolved in 100 cc. of methanol. A solution of sodium methylate which contains 0.25 mole of dissolved sodium, is added to this solution. The mixture is subsequently treated with 500 cc. of benzene, and methanol and benzene are distilled off azeotropically. The residual sodium salt of 2,6-di-tert.butyl-4-cyano-phenol is dissolved in 300 cc. of acetonitrile, 33 g. (0.25 mole) of dimethyl-thionophosphinic acid chloride are added with stirring at 80° C. to the reaction mixture which is heated to 80° for another 2 hours, and then poured into 200 cc. of ice water. The separated oil is taken up in 200 cc. of benzene, the benzene solution washed with water until the reaction is neutral, and dried over sodium sulphate. After distilling off the solvent there are obtained 47 g. (58% of the theoretical yield) of dimethyl-thionophosphinic acid-O-(2,6-di-tert.butyl-4-cyano-phenyl) ester of M.P. 118° C.

Rats show after oral administration of 1000 mg. of the ester per kg. of animal no symptoms of poisoning. Caterpillars are destroyed by 0.1% solutions to 100%.

In the same way there may be obtained the following compounds:

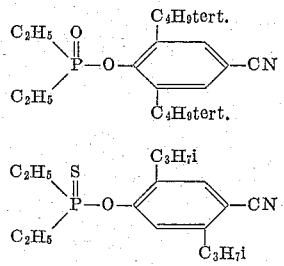

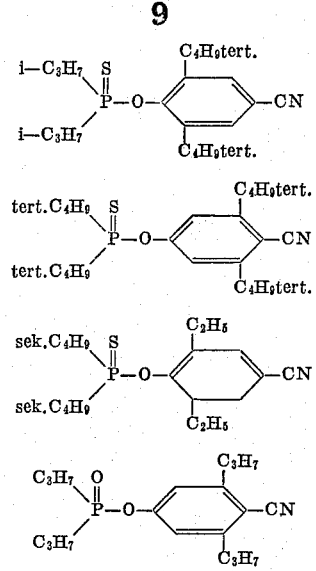

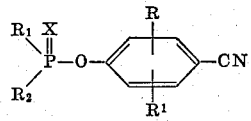

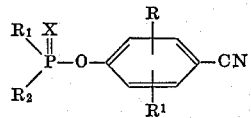

I claim:
1. A compound of the formula

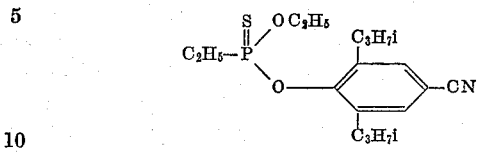

wherein $R_1$ stands for lower alkoxy, $R_2$ stands for lower alkyl, R and $R^1$ stand for lower alkyl having up to 4 carbon atoms and X stands for a chalcogen of an atomic weight less than 40.

2. A compound of the formula

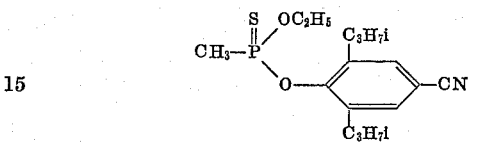

wherein $R_1$ and $R_2$ stand for lower alkyl, R and $R^1$ stand for lower alkyl having up to 4 carbon atoms and X stands for a chalcogen of an atomic weight less than 40.

3. The compound of the following formula

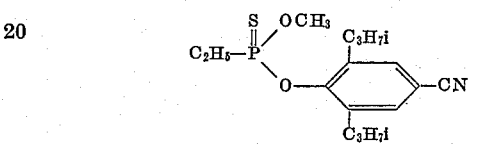

4. The compound of the following formula $$CH_3-\overset{\overset{S}{\|}}{P}\diagup\overset{OC_2H_5}{}\diagdown\text{...}$$

5. The compound of the following formula

References Cited in the file of this patent

UNITED STATES PATENTS

| | | |
|---|---|---|
| 2,758,954 | Tidwell | Aug. 14, 1956 |
| 2,784,207 | Geoghegan et al. | Mar. 5, 1957 |
| 2,967,884 | Dunn et al. | Jan. 10, 1961 |
| 3,078,212 | Newallis et al. | Feb. 19, 1963 |

OTHER REFERENCES

Fukuto et al.: "J. Agri. Food Chem.," vol. 4, pp. 930–935 (Nov. 1956).

Metcalf: "Organic Insecticides," Interscience Publishers, Inc., New York (1955), page 292.

Schrader: "Angew. Chem." 73, pages 331–334 (May 1961).

UNITED STATES PATENT OFFICE
CERTIFICATE OF CORRECTION

Patent No. 3,164,623                 January 5, 1965

Gerhard Schrader

It is hereby certified that error appears in the above numbered patent requiring correction and that the said Letters Patent should read as corrected below.

Column 7, lines 17 to 22, the formula should appear as shown below instead of as in the patent:

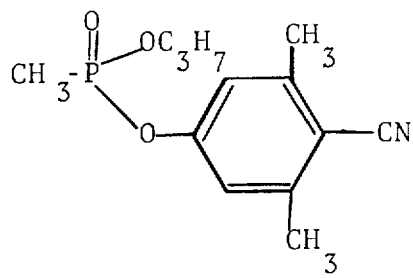

column 8, lines 9 to 12, the formula should appear as shown below instead of as in the patent:

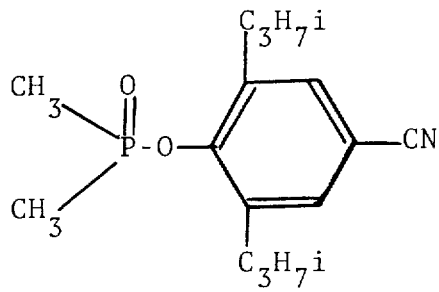

Signed and sealed this 27th day of July 1965.

(SEAL)
Attest:

ERNEST W. SWIDER                 EDWARD J. BRENNER
Attesting Officer                Commissioner of Patents